(12) United States Patent
Kuzsma, Jr. et al.

(10) Patent No.: US 8,336,023 B2
(45) Date of Patent: Dec. 18, 2012

(54) EXTENSIBLE CODE VISUALIZATION

(75) Inventors: Richard Cox Kuzsma, Jr., Nashua, NH (US); Michael Robert Humphrey, Medford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1092 days.

(21) Appl. No.: 12/256,266

(22) Filed: Oct. 22, 2008

(65) Prior Publication Data

US 2009/0125877 A1 May 14, 2009

Related U.S. Application Data

(60) Provisional application No. 60/981,689, filed on Oct. 22, 2007.

(51) Int. Cl.
*G06F 9/44* (2006.01)
(52) U.S. Cl. ........ 717/105; 717/106; 717/109; 717/110; 717/121
(58) Field of Classification Search ........................ None
See application file for complete search history.

(56) References Cited

U.S. PATENT DOCUMENTS

| | | | | |
|---|---|---|---|---|
| 6,819,344 | B2* | 11/2004 | Robbins | 715/848 |
| 7,114,149 | B2* | 9/2006 | Aptus et al. | 717/123 |
| 7,207,064 | B2* | 4/2007 | Fee et al. | 726/14 |
| 7,246,326 | B2* | 7/2007 | Haley | 715/762 |
| 7,523,395 | B1* | 4/2009 | Namait et al. | 715/255 |
| 7,689,970 | B1* | 3/2010 | Englehart et al. | 717/109 |
| 2004/0088688 | A1* | 5/2004 | Hejlsberg et al. | 717/143 |
| 2004/0250236 | A1* | 12/2004 | O'Malley et al. | 717/104 |
| 2005/0097453 | A1* | 5/2005 | Simonyi | 715/513 |
| 2005/0229154 | A1* | 10/2005 | Hiew et al. | 717/110 |
| 2007/0055972 | A1* | 3/2007 | Brown et al. | 717/174 |
| 2007/0073763 | A1* | 3/2007 | Betts et al. | 707/102 |
| 2008/0098349 | A1* | 4/2008 | Lin et al. | 717/106 |
| 2008/0127057 | A1* | 5/2008 | Costa et al. | 717/106 |

\* cited by examiner

*Primary Examiner* — Isaac Tecklu
(74) *Attorney, Agent, or Firm* — Kraguljac Law Group LLC

(57) ABSTRACT

A method, apparatus and computer program product for providing extensible code visualization are presented. Program code is received. A model is generated relating to the program code. The model is mapped to a user interface (UI) to produce a UI reflecting the program code. Changes made to the program code are reflected in the UI and changes made to the UI are reflected in the program code via the model.

20 Claims, 10 Drawing Sheets

EXTENSIBLE CODE VISUALIZATION

CROSS REFERENCE TO RELATED APPLICATIONS

The present application claims the benefit of U.S. Provisional Patent Application No. 60/981,689, filed on Oct. 22, 2007, which is incorporated herein by reference in its entirety.

BACKGROUND

Graphical user interfaces (GUIs) can be used to render computer program code (e.g., C++, Java, etc.) in various predefined views, such as a code (or syntactical) view, a tree view, etc. The process of rendering a predefined view of computer program code in a GUI is referred to as code visualization. A technical person typically utilizes the code view, whereas a non-technical person typically uses a tree view. There are a number of software products readily available that provide code visualization.

SUMMARY

Conventional mechanisms such as those explained above suffer from a variety of deficiencies. One such deficiency is that extensibility is not provided in conventional code visualization processes.

Embodiments of the invention significantly overcome such deficiencies and provide mechanisms and techniques that provide extensible code visualization. In a particular embodiment of a method for providing extensible code visualization, the method includes acquiring program code. The method further includes generating a model relating to the program code. The method also includes mapping the model to a graphical user interface (GUI) to produce a GUI reflecting the program code in one or more predefined views.

Other embodiments include a computer readable medium having computer readable code thereon for providing extensible code visualization. The computer readable medium includes instructions for acquiring program code. The computer readable medium further includes instructions for generating a model relating to the program code. The computer readable medium also includes instructions for mapping the model to a GUI to produce a GUI reflecting the program code in one or more predefined views.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides extensible code visualization as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing extensible code visualization as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Oracle International Corporation of Redwood Shores, Calif.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments herein provide a code visualizer that enables users to add their own visualizations of arbitrary portions of code. For example, if a user types a new function in their code (e.g., "LoginToMyApplication( )"), then by default that new function will appear as a generic function call node in the user interface. However, the user can specify (e.g., through an eXtensible Markup Language "XML" configuration file) how to make the "LoginToMyApplication( )" node appear in the UI with a specific icon, label, etc.

It should be noted that embodiments herein enable users to create their own UI to render model elements, and leverage existing UI components to render newly invented model elements.

Figure 1:
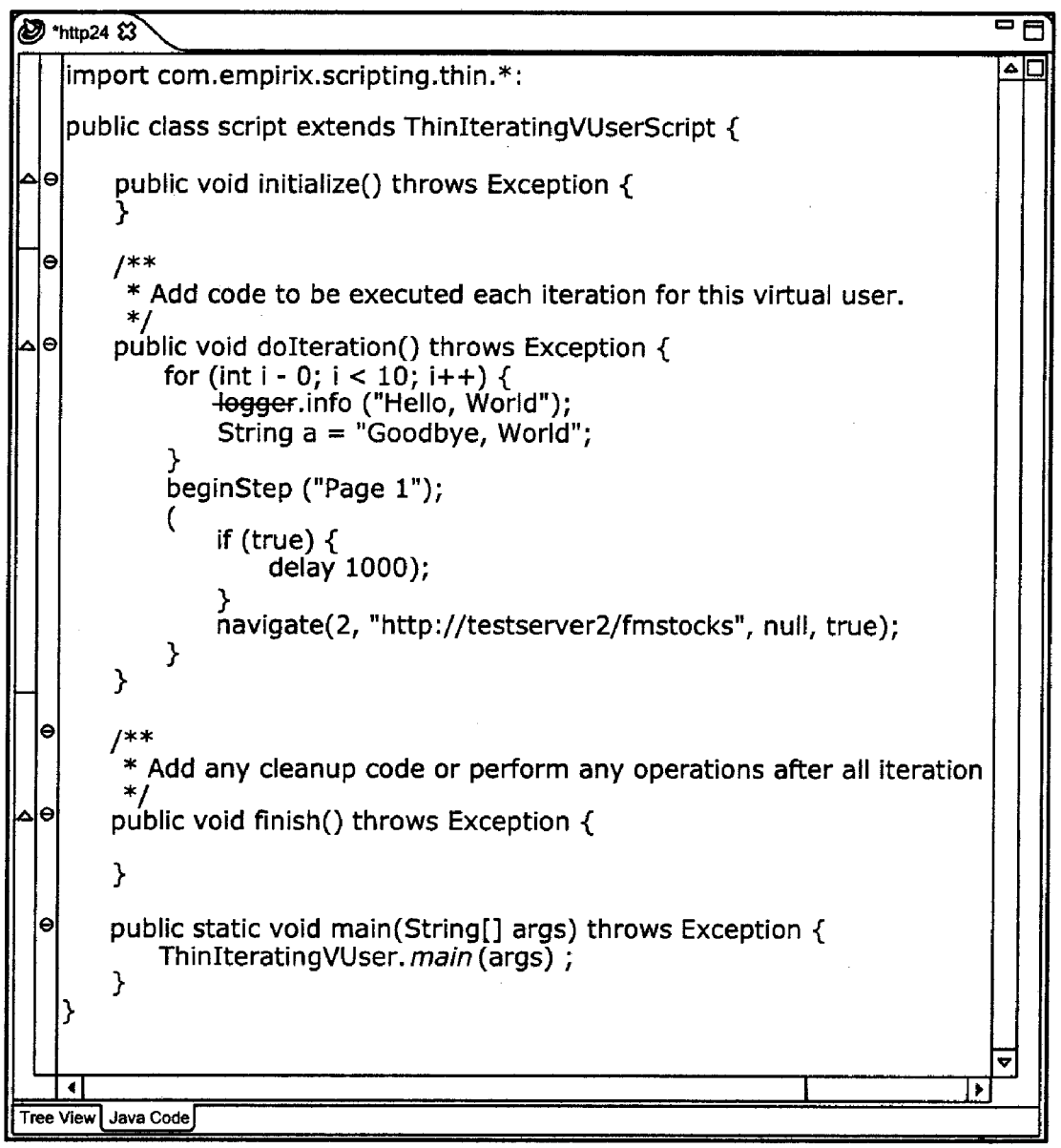
FIG. 1 is an example diagram illustrating a code (or syntactical) view in a graphical user interface according to embodiments herein.
Figure 2:
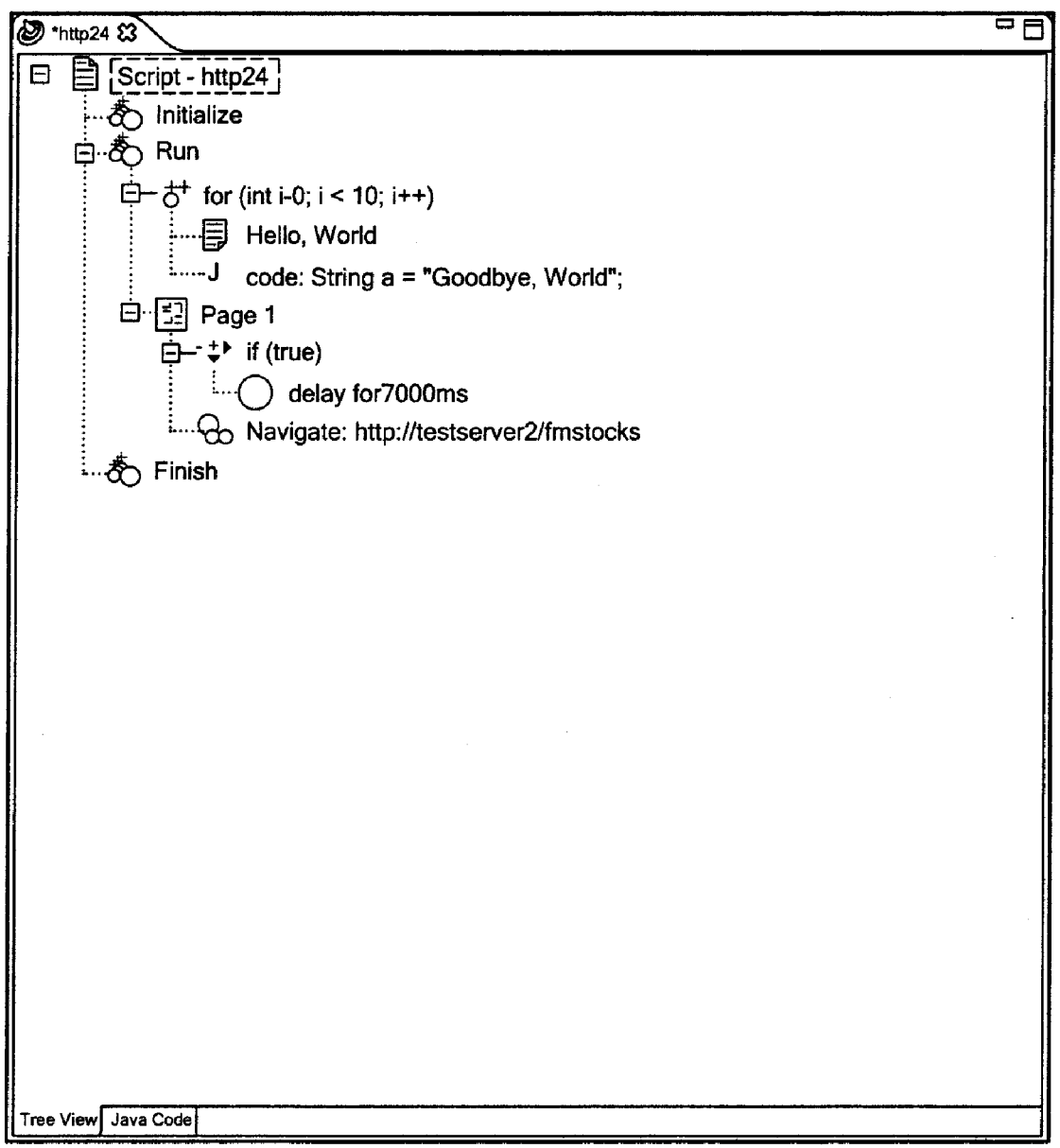
FIG. 2 is an example diagram illustrating a tree view in a graphical user interface according to embodiments herein.

For example, FIG. 1 shows an example diagram illustrating a code (or syntactical) view in a graphical user interface 10 according to embodiments herein. Similarly, as another example, FIG. 2 shows an example diagram illustrating a tree view 12 in a graphical user interface according to embodiments herein.

Note that such embodiments are not only limited to function calls or pre-determined syntax. Additionally, users can write code having an arbitrary syntax or language (i.e. Ruby, Python, C++, Hyper Text Markup Language (HTML), etc.) and provide an eXtensible Markup Language (XML) markup to display such code in the UI.

Furthermore, embodiments herein provide the ability for users to specify how to propagate changes from the UI into the code, and to propagate changes from the code into the UI.

For example, in one embodiment the extensible visualization process includes parsing syntactical code and breaking down the code into an Abstract Syntax Tree (AST). Conventional compilers support such process, such as Java AST. The process further includes providing an XML file to let users map the AST into an object model. The process additionally includes providing an XML file for each UI visualizer (i.e. Tree View, Workflow View, Picture View, etc.) to let users map the object model into the UI.

After a user maps their code into a model element, the user can map UI components to the model element. For example, suppose a tree view UI (e.g., as shown in FIG. 2) displays a model element as a node in a tree. As such, part of the tree view UI would be a set of configuration options for the user to specify how their model element should be rendered. For the model element, a user may specify a custom label, icon, icon overlay, background color, font, or additional formatting options that are amenable for rendering a typical tree view.

In another embodiment, a custom UI for a model element includes a hexadecimal "hex" editor. For example, a user may have a model element that contains some binary data. The user can then map portions of his model element to the hex editor, which then displays a more meaningful hexadecimal representation of the binary data contained in the model element.

Yet another embodiment includes a view having a model element that contains Hypertext Markup Language "HTML" syntax/code, and represents the HTML code in a syntax-coloring HTML editor. Similarly, such a view may also take the same HTML code and render it graphically in a browser. Alternatively, as in one particular embodiment, the code visualizer only displays the request and response headers of an HTML page in the text field.

As an example, consider a user producing a test script who wants to record some Transmission Control Protocol/Internet Protocol "TCP/IP" packets into his or her script. The TCP/IP data could be mapped to a model element and rendered in a view that shows all the various parts of the TCP/IP header, such as all SYN and ACK data.

FIGS. 3 through 9 show an example implementation of an extensible code visualizer according to embodiments herein. More specifically, FIGS. 3-9 represent example steps for configuring and customizing the code visualizer.

In this example, described in more detail below, the code visualizer includes a KeyStroke Module having a fully functioning Code Library. Further assume that the KeyStroke Module includes a "KeyStrokeFunctions.pressKey(String keyToPress)" function (e.g., in code). Thus, FIGS. 3-9 show example steps for providing a visual representation of the pressKey( ) function in the UI. In this particular example, the KeyStrokeFunctions.pressKey(String keyToPress) function will be added as a node in the Tree View and will also be added into the Property Grid.

In order to add visualization for a code (e.g., KeyStrokeFunctions.pressKey(String keyToPress)) function in the Tree View and Property Grid, the following steps are executed:

A new Model Element is created. For example, a PressKeyElement is created to represent the new function that will be shown in the UI. Next, the Model Element is mapped to Java Code. The code function (e.g., KeyStrokeFunctions.pressKey(String keyToPress)) has to be mapped to the new Model Element so that when the code changes, the UI can be updated and vice-versa. Then, the Model Element is mapped to the Tree View. The user is able to specify what kind of label and icon to use for a new "press key" tree node. Finally, the Model Element is mapped to the Property Grid. The key to press is displayed as a property in the Property Grid so that users can see and change it through the UI.

A Model Element is the basic building block of the UI. Every node shown in the Tree View, for example, corresponds to a Model Element. A Model Element is the primary means through which UI and refactoring functions can add/remove/modify the script. By using Model Elements, the task of modifying a script is separated from the task of storing it in the code.

Figure 3:
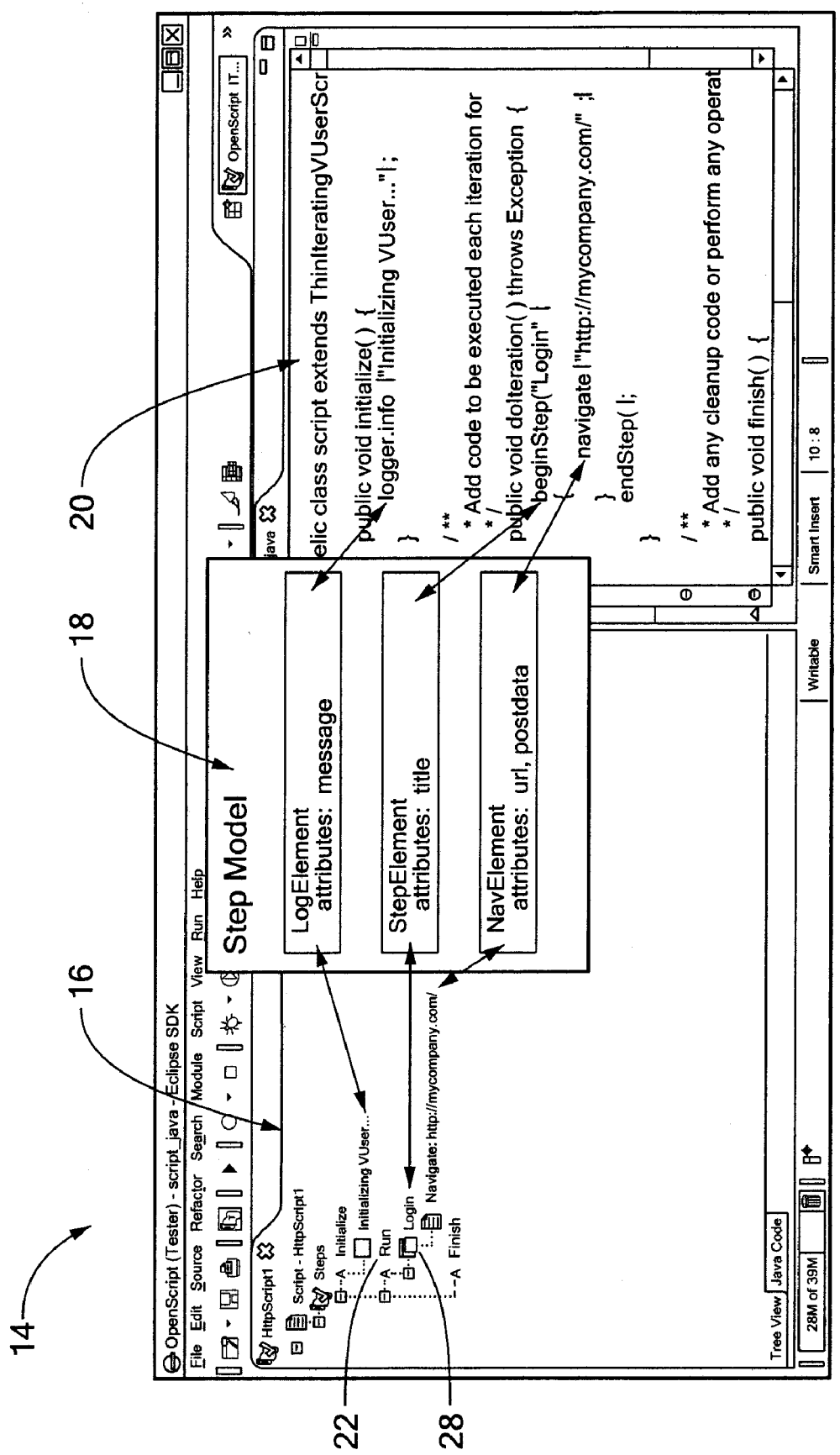
FIG. 3 is an example diagram illustrating configuration of an extensible code visualizer according to embodiments herein.

For example, the screen shot 14 of FIG. 3 shows that every node in the tree view 16 corresponds to a Model Element in the code 20 by way of model 18. For example the Initializing VUser node 22 in tree view 16 corresponds to model element 24 in model 18 that in turn corresponds to element 26 in code view 20. Similarly, the Initializing login node 24 in tree view 16 corresponds to model element 30 in model 18 that in turn corresponds to element 32 in code view 20 and the Navigate node 30 in tree view 16 corresponds to model element 32 in model 18 that in turn corresponds to element 34 in code view 20.

According to one embodiment, in order to create a Model Element to represent the KeyStrokeFunctions.pressKey (String keyToPress) code function, the following steps are performed:

The user creates a new PressKeyElement Java class and inserts Java code resembling that shown in Table I. The code in Table 1 contains attribute getter and setter functions of the "KeyStokeFunctions.pressKey(String keyToPress)" method. The IModelElement interface contains one method, public String getType( ), that returns a unique type ID for the model element.

TABLE I

```
public class PressKeyElement implements IModelElement
{
    public String getType( ) {
        return
"com.mycompany.modules.KeyStrokeModule.modelElements.
PressKeyElement";
        public static final String ATTR_KEY_TO_PRESS =
"keyToPress";
        public Expression getKeyToPress( ) {
            return super.getAttribute(ATTR_KEY_TO_PRESS);
        }
        public void setKeyToPress(Expression value) {
            super.setAttribute(ATTR_KEY_TO_PRESS, value);
        }
}
```

Figure 5:
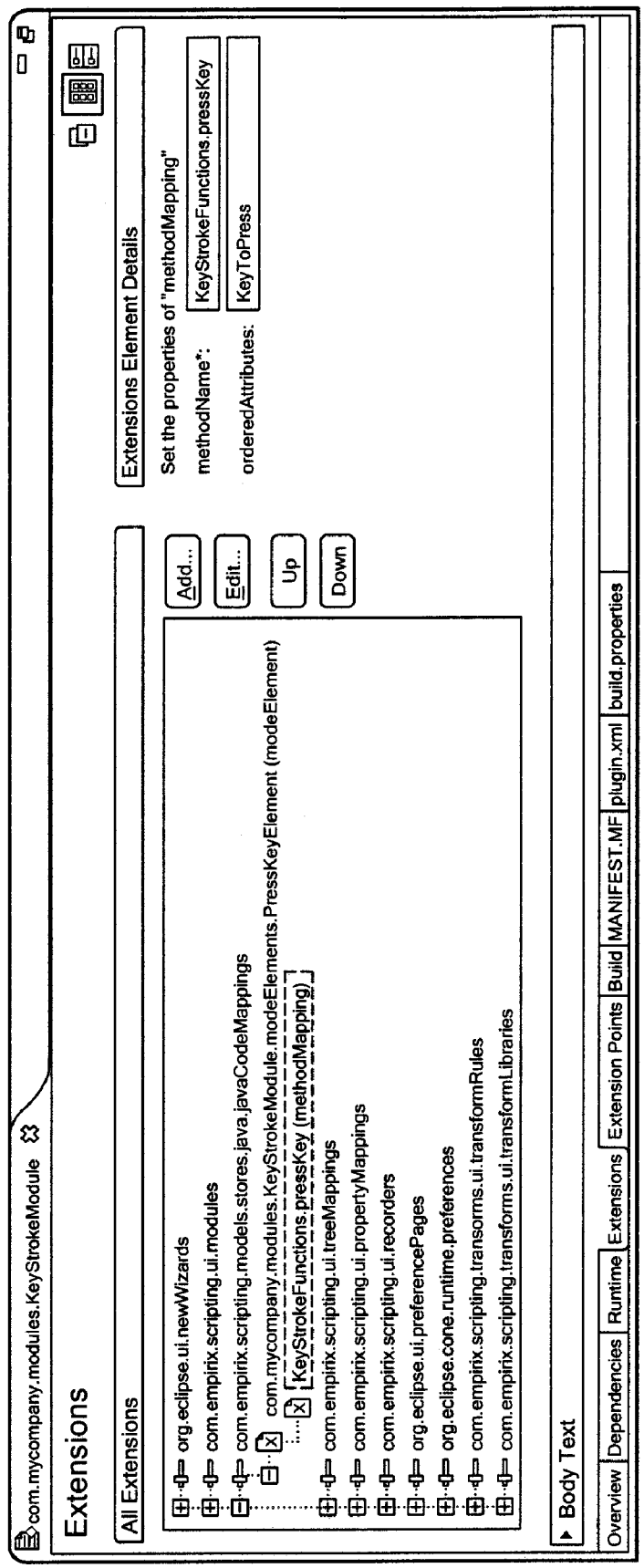
FIG. 5 is an example diagram illustrating an example configuration for setting modelMapping details according to embodiments herein.
Figure 6:
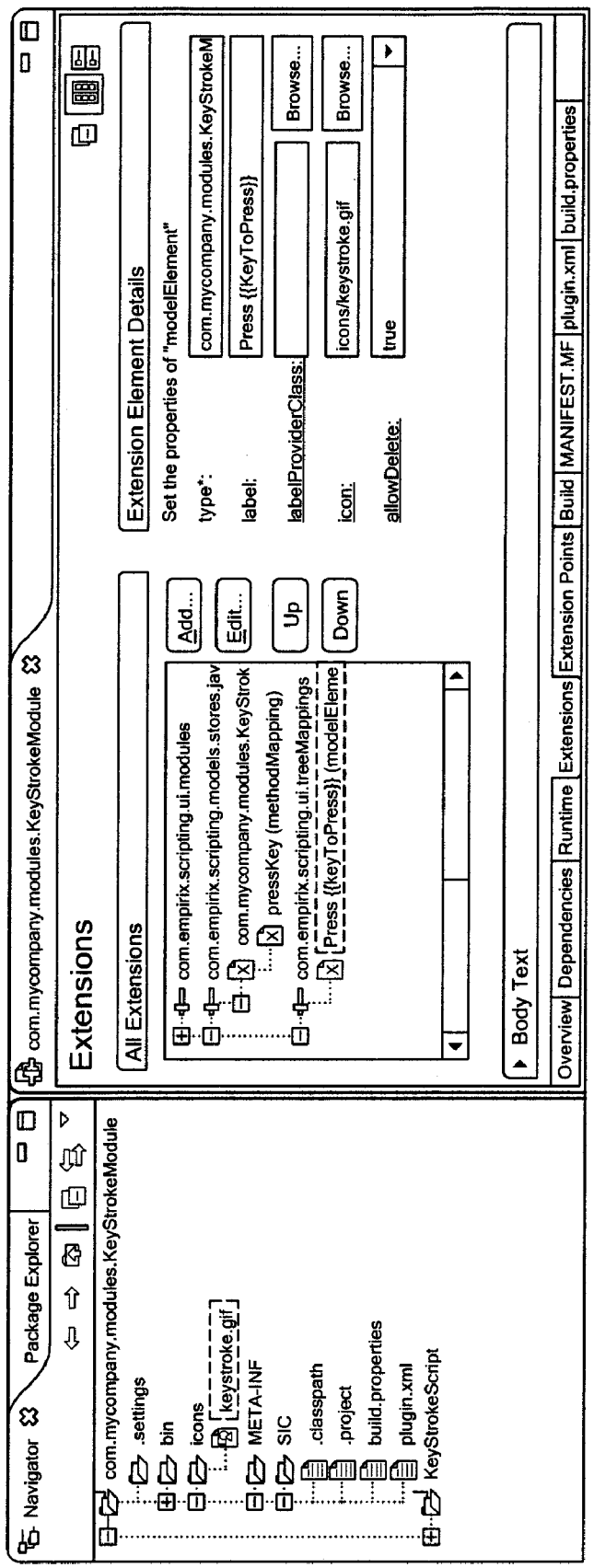
FIG. 6 is an example diagram illustrating an example embodiment for setting an icon for the pressKey( ) model according to embodiments herein.

Next, the user creates an XML configuration file containing language to describe how the model element and Java Code should be mapped (see FIGS. 5 and 6).

```
<extension
            point="oracle.oats.scripting.models.stores.java.
javaCodeMappings">
        <modelElement
type="com.mycompany.modules.KeyStrokeModule.modelElements.
PressKeyElement">
            <methodMapping
                methodName="KeyStrokeFunctions.pressKey"
                orderedAttributes="keyToPress"/>
        </modelElement>
</extension>
```

The <extension> element in the XML specifies what is being extended (Java Code Mappings). The tags inside the <extension> element specify parameters to the Java Code Mapping algorithm. <modelElement> specifies the model element class (PressKeyElement). Under <methodMapping>, methodName specifies the function name as it appears in Java code (KeyStrokeFunctions.pressKey). orderedAttributes lists each model element attribute in the order that they appear in the KeyStrokeFunctions.pressKey(String keyToPress) code function.

According to one embodiment, once the PressKeyElement is mapped to Java Code, the element will be automatically added into the Step Model whenever the script's Java code is opened, created, or modified. In order to make the PressKeyElement appear in a Tree View, the user creates an XML configuration file containing language to describe how to map the model element to the Tree View (see FIG. 7).

```
<extension
            point="oracle.oats.scripting.ui.treeMappings">
        <modelElement
```

-continued

```
                icon="icons/keystroke.gif"
                label="Press { {keyToPress} }"
type="com.mycompany.modules.keyStrokeModule.modelElements.
PressKeyElement"/>
</extension>
```

The <extension> element in the XML specifies what is being extended (Tree View). The tags inside the <extension> element specify parameters for the TreeView so it knows how to display the com.mycompany.modules.keyStrokeModule.modelElements.PressKeyElement Model Element.

Figure 8:
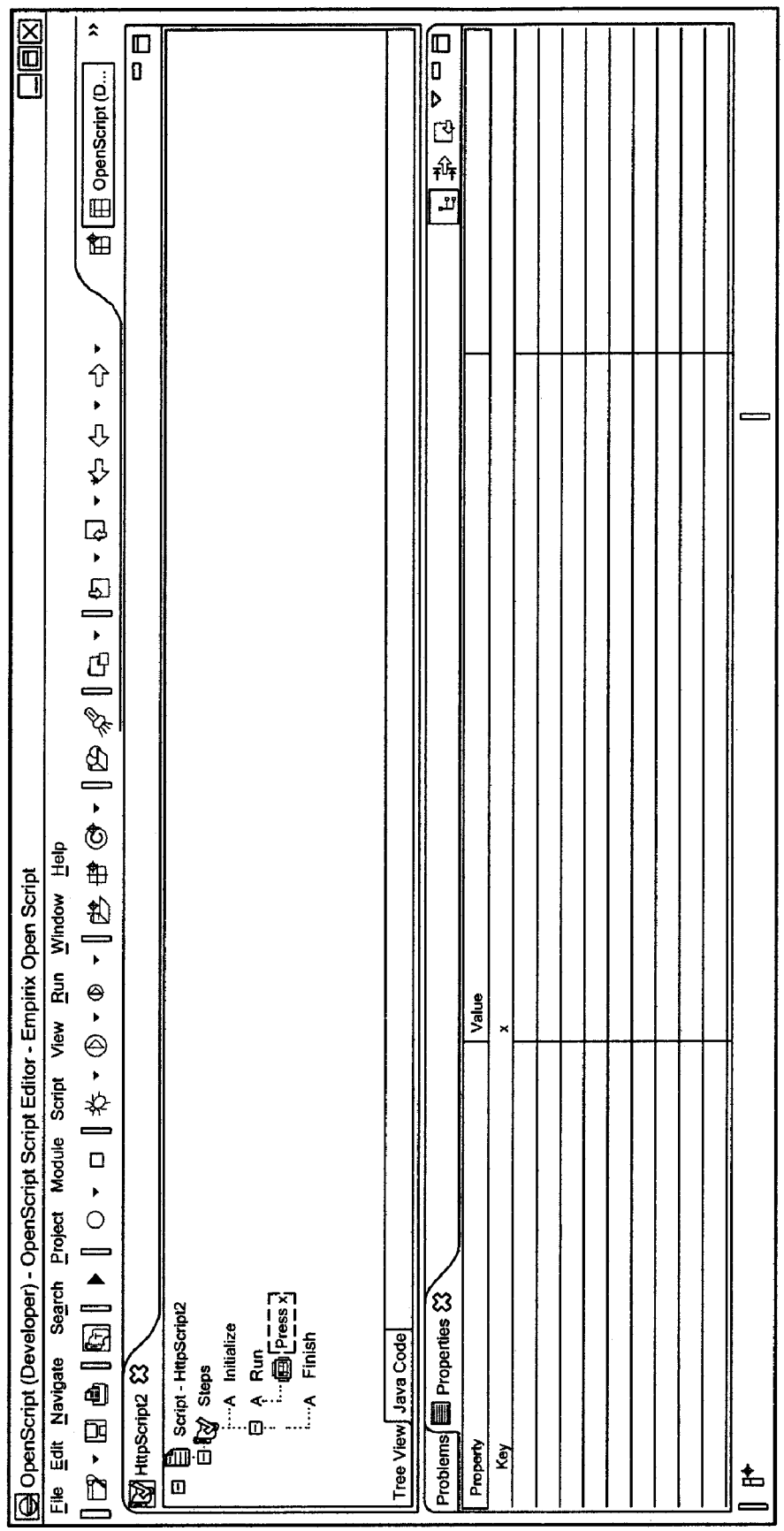
FIG. 8 is an example embodiment of how a UI will look according to embodiments herein.

According to one embodiment, in addition to displaying the KeyStrokeModule.pressKey(String keyToPress) function as a node in the Tree View, the user can also use the Property Grid to view and modify which key to press. FIG. 8 shows an example embodiment 44 for setting details for a particular attribute. To display properties for the PressKeyElement in the Property Grid, the user creates an XML configuration file containing language to describe how to map the model element to the Property Grid (see FIG. 8).

```
<extension
            point="oracle.oats.scripting.ui.
propertyGridMappings">
        <modelElement
type="com.mycompany.modules.keyStrokeModule.modelElements.
PressKeyElement">
            <attribute
                id="keyToPress"
                label="Key to press:"/>
        </modelElement>
</extension>
```

The <extension> element in the XML specifies what is being extended (Property Grid). The tags inside the <extension> element specify parameters for the Property Grid so it knows how to display the com.mycompany.modules.keyStrokeModule.modelElements.PressKeyElement Model Element for viewing and editing.

According to one embodiment, in order to create a Model Element to represent the pressKey( ) code function, the following steps are performed:

First, a plug-in dependency is added to the KeyStroke Module for the com.empirix.scripting.models plug-in if it does not exist already. Then the plugin.xml file is saved. Next, the user right-clicks on the "src" folder in the Package Explorer and add a new Java Package called com.mycompany.modules.KeyStrokeModule.modelElements. Then the user right-clicks on the com.mycompany.modules.KeyStrokeModule.modelElements package in the Package Explorer and chooses New->Class. The user then types PressKeyElement for the name of the class. Next, a the code from Table I is added into the newly created PressKeyElement class. The code contains four constructors, similar to the ones in StepElement class. Additionally, the code in Table 1 contains attribute getter and setter functions of "pressKey( )" method.

TABLE 1

```
package com.mycompany.modules.KeyStrokeModule.
modelElements;
    import com.empirix.scripting.models.*;
    import com.empirix.scripting.models.expressions.*;
    public class PressKeyElement extends StepElement
    {
```

TABLE 1-continued

```
        public static final ModelElementType ELEMENT_TYPE =
            new ModelElementType(PressKeyElement.class.
getName( ));
        public PressKeyElement(Model model) {
            super(ELEMENT_TYPE, model);
        }
        public PressKeyElement(ModelElementType type,
Model model) {
            super(type, model);
        }
        public PressKeyElement(Model model, int id) {
            super(model, id);
        }
        public static final String ATTR_KEY_TO_PRESS =
"keyToPress";
        public Expression getKeyToPress( ) {
            return getAttribute(ATTR_KEY_TO_PRESS);
        }
        public void setKeyToPress(Expression value) {
            setAttribute(ATTR_KEY_TO_PRESS, value);
        }
        public void setKeyToPress(String value) {
            setAttribute(ATTR_KEY_TO_PRESS, value ==
null ? null : new
Literal(value));
        }
    }
```

Figure 4:
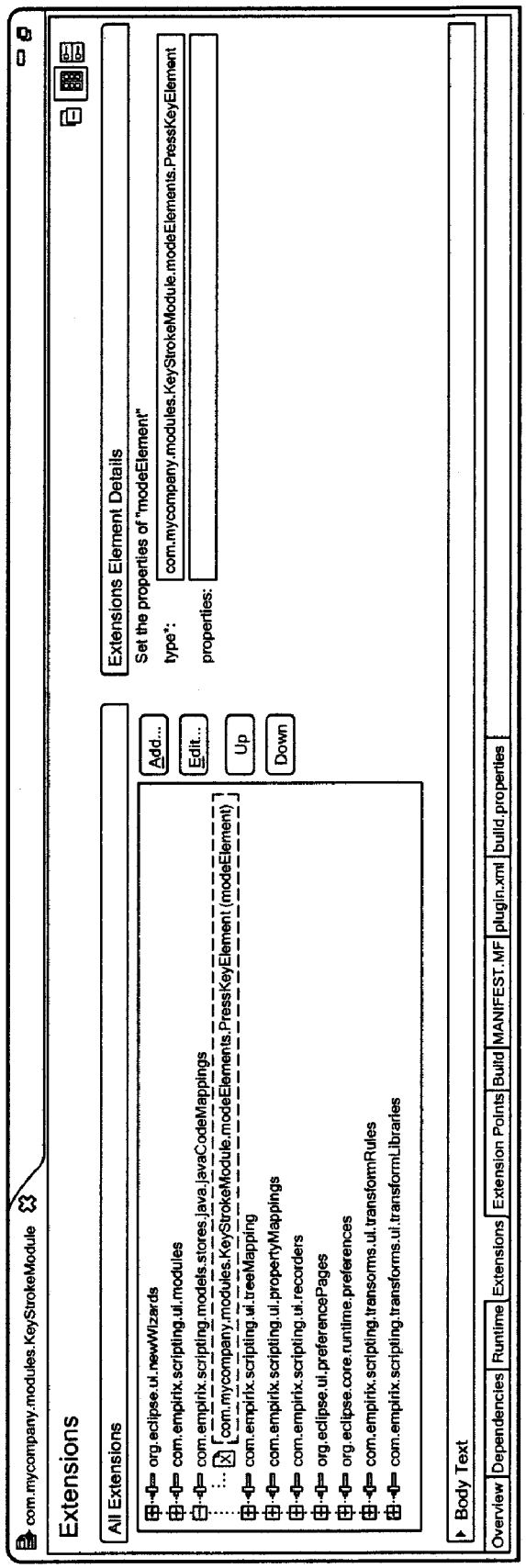
FIG. 4 is an example diagram illustrating an example configuration for setting modelElement details according to embodiments herein.

According to one embodiment, the code function pressKey( ) has to be mapped to the PressKeyElement so that when the code changes, the PressKeyElement changes, and vice-versa (e.g., when the PressKey Element changes, then the code changes). FIG. 4 shows an example configuration 42 for setting modelElement details. To map the element to Java Code, the following steps are performed:

The com.empirix.scripting.models.storesjavajavaCodeMappings extension point is added to the KeyStroke Module. The user then right-clicks on the new extension point and clicks New, modelElement. The user then types com.mycompany.modules.KeyStrokeModule.modelElements.PressKeyElement for the "type" field and leaves the properties field blank.

FIG. 5 shows an example configuration for setting modelMapping details. The user then right-clicks on the new model element and clicks New, methodMapping. For the "methodName" field, the user enters KeyStrokeFunctions.pressKey, and for the "orderedAttributes" field, the user enters keyToPress.

According to one embodiment, once the PressKeyElement is mapped to Java Code, the element will be automatically added into the Step Model whenever the script's Java code is opened, created, or modified. In order to make the PressKeyElement appear in the Tree View, the user would perform the following steps:

First the user would add the com.empirix.scripting.ui.treeMappings extension point to the KeyStroke Module. The user would then right-click on the new extension point and click New, modelElement. For the "type" field, the user enters: com.mycompany.modules.KeyStrokeModule.modelElements.PressKeyElement. For the "label" field, the user enters: Press {{keyToPress}}.

Figure 7:
FIG. 7 is an example diagram illustrating setting details for a particular attribute according to embodiments herein.

In one embodiment, a custom icon can be displayed for the node. FIG. 6 shows an example embodiment for setting an icon for the pressKey( ) model. To add an icon the following steps are performed:

First, an icon image (such as a .GIF image) is created that is 16 pixels long by 16 pixels wide using any image-editing program. Next, from the "Navigator" view, a new folder is created in the root directory of the KeyStroke module called "icons" and the icon is copied into the folder. The user enters the path for the icon, i.e. icons/keystroke.gif. and downloads keystroke.gif According to one embodiment, in addition to displaying the pressKey( ) function as a node in the Tree View, the user can also use the Property Grid to view and modify which key to press. FIG. 7 shows an example embodiment 44 for setting details for a particular attribute. To display properties for the PressKeyElement in the Property Grid, the following steps are performed:

The user adds the com.empirix.scripting.ui.propertyMappings extension point to the KeyStroke Module. The user right-clicks on the new extension point and clicks New, modelElement. For the "type" field, the use enters: com.mycompany.modules.KeyStrokeModule.modelElements.PressKeyElement. the user then right-clicks on the modelElement node and clicks New, attribute. For the "name" field, the user enters: keyToPress, and for the "label" field, the user enters: Key. All other attributes may be left alone FIG. 8 shows an example embodiment of how the UI 46 will look.

According to one embodiment, in order to see the new visualization, the following steps are performed:

First, the user debugs the module. The user then, in the debug instance, the user creates a new script based on any module. Under the "Script" menu, the user clicks "Configure Modules" and checks on the KeyStroke Module. The user can switch to the Java Code tab and add some code to press the key. The user can then switch back to the Tree View to see the UI representation of the code.

One skilled in the art of programming could write code to traverse the nodes of an Abstract Syntax Tree (AST) for a particular piece of code. While traversing the nodes, if a node were found that matches a code element described in the XML configuration file (see FIG. 5), the node would be connected to the described model element. When the user modifies the node, i.e. when the code changes, the AST can be reparsed and the connected model element would be updated to reflect the code change. When the user modifies the model element, i.e. when the user changes a value in a Property Grid, the connected node would be updated to reflect the changed value.

Figure 9:
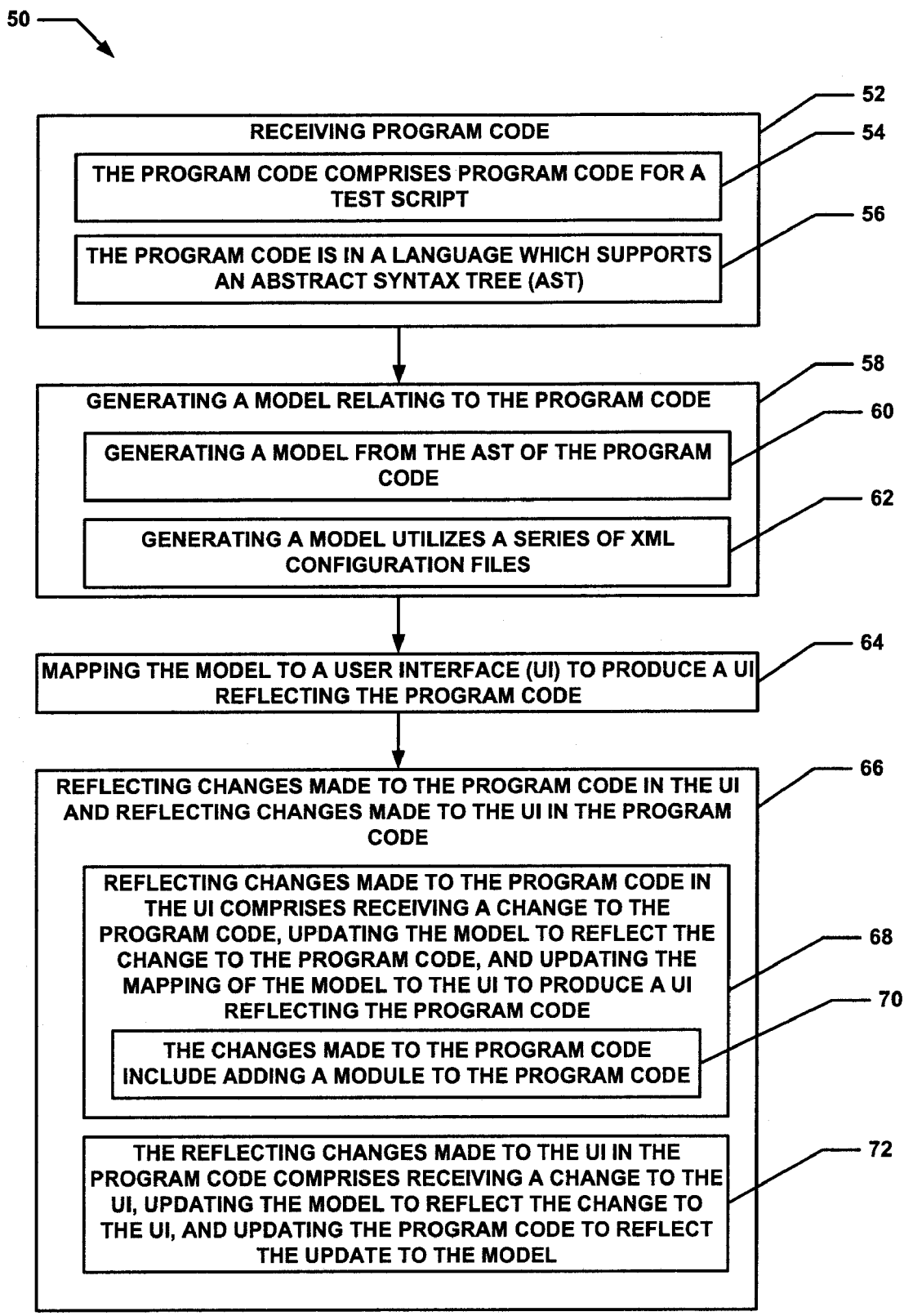
FIG. 9 depicts a flow diagram of a particular embodiment of a method for providing extensible code visualization.

A flow chart of the presently disclosed method is depicted in FIG. 9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 9, a particular embodiment of a method 50 of providing extensible code visualization is shown. Method 50 begins with processing block 52 which discloses receiving program code. Processing block 54 states wherein the program code comprises program code for a test script. Processing block 56 states wherein the program code is in a language which supports an abstract syntax tree (AST).

Processing block 58 discloses generating a model relating to the program code. Processing block 60 states generating a model from the AST of the program code. Processing block 62 recites generating a model utilizes a series of XML configuration files.

Processing continues with processing block 64 which discloses mapping the model to a user interface (UI) to produce a UI reflecting the program code.

Processing block 66 states reflecting changes made to the program code in the UI and reflecting changes made to the UI in the program code. As shown in processing block 68 reflecting changes made to the program code in the UI comprises receiving a change to the program code, updating the model to reflect the change to the program code, and updating the mapping of the model to the UI to produce a UI reflecting the program code. Processing block 70 recites wherein the changes made to the program code include adding a module to the program code. Processing block 72 shows wherein the reflecting changes made to the UI in the program code comprises receiving a change to the UI, updating the model to reflect the change to the UI, and updating the program code to reflect the update to the model.

Figure 10:
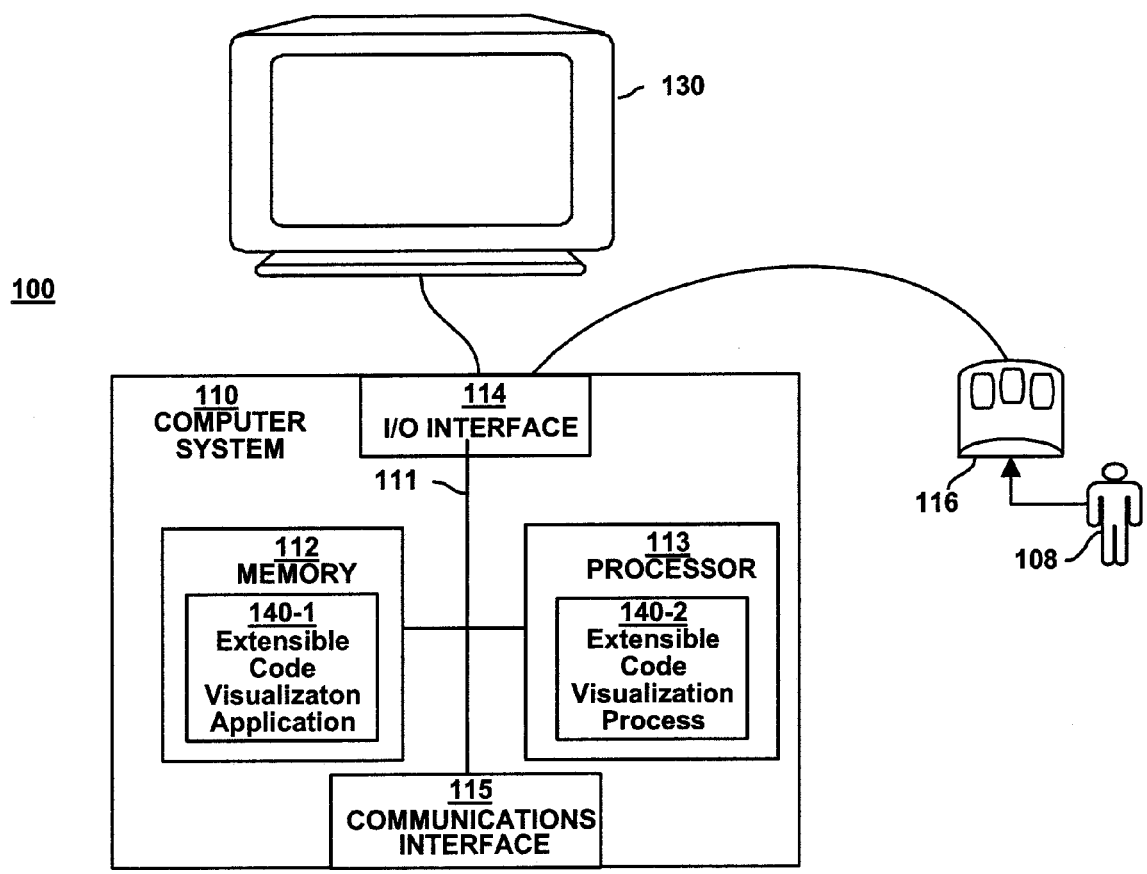
FIG. 10 illustrates an example computer system architecture for a computer system that provides extensible code visualization in accordance with embodiments of the invention.

FIG. 10 is a block diagram illustrating example architecture of a computer system 110 that executes, runs, interprets, operates or otherwise performs an extensible code visualization application 140-1 and extensible code visualization process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the extensible code visualization application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an extensible code visualization application 140-1 as explained herein. The extensible code visualization application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a extensible code visualization application 140-1. Execution of an extensible code visualization application 140-1 in this manner produces processing functionality in the extensible code visualization process 140-2. In other words, the extensible code visualization process 140-2 represents one or more portions or runtime instances of a extensible code visualization application 140-1 (or the entire a extensible code visualization application 140-1) performing or executing within or upon the processor 113 in the computerized device 110 at runtime.

It is noted that example configurations disclosed herein include the extensible code visualization application 140-1 itself (i.e., in the form of un-executed or non-performing logic instructions and/or data). The extensible code visualization application 140-1 may be stored on a computer readable medium (such as a floppy disk), hard disk, electronic, magnetic, optical, or other computer readable medium. An extensible code visualization application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of an extensible code visualization application 140-1 in the processor 113 as the extensible code visualization process 140-2. Those skilled in the art will understand that the computer system 110 may include other processes and/or software and hardware components, such as an operating system not shown in this example.

A display 130 need not be coupled directly to computer system 110. For example, the extensible code visualization application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the extensible code visualization application 140-1. Execution of extensible code visualization application 140-1 produces processing functionality in extensible code visualization process 140-2. In other words, the extensible code visualization process 140-2 represents one or more portions of the extensible code visualization application 140-1 (or the entire application) performing within or upon the processor 113 in the computer system 100.

It should be noted that, in addition to the extensible code visualization process 140-2, embodiments herein include the extensible code visualization application 140-1 itself (i.e., the un-executed or non-performing logic instructions and/or data). The extensible code visualization application 140-1 can be stored on a computer readable medium such as a floppy disk, hard disk, or optical medium. The extensible code visualization application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of extensible code visualization application 140-1 in processor 113 as the extensible code visualization process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant (s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method of providing extensible code visualization comprising:
    analyzing, using at least a processor, program code;
    generating, using at least the processor, a model relating to said program code;
    mapping said model to a user interface (UI) to produce a UI comprising nodes that reflect said program code;
    providing a code visualizer to allow a user to add a selected visualization to a selected code element of the program code by specifying, in a configuration file, the selected visualization for a node in the UI corresponding to the selected code element of the program code,
    parsing the configuration file, when the configuration file is changed, to determine the selected visualization and the corresponding selected code element;
    traversing the nodes of the UI to identify a node with a matching element that matches the selected code element from the configuration file; and
    updating the UI by displaying the identified node on a screen with the selected visualization.

2. The method of claim 1 wherein said program code comprises program code for a test script.

3. The method of claim 1 wherein generating the model includes parsing said program code and generating an abstract syntax tree (AST).

4. The method of claim 3 wherein said generating a model comprises generating a model from said AST of said program code.

5. The method of claim 1 wherein said providing includes providing the configuration file as a series of extensible markup language (XML) configuration files.

6. The method of claim 1 further comprises reflecting changes made to said program code in said UI and reflecting changes made to said UI in said program code.

7. The method of claim 6 wherein said reflecting changes made to said program code in said UI comprises:
    receiving a change to said program code;
    updating said model to reflect the change to said program code; and
    updating said mapping of said model to said UI to produce a UI reflecting said program code.

8. The method of claim 6 wherein said reflecting changes made to said UI in said program code comprises:
    receiving a change to said UI;
    updating said model to reflect the change to said UI; and
    updating said program code to reflect the update to said step model.

9. The method of claim 7 wherein said changes made to said program code include adding a module to said program code.

10. A non-transitory computing readable medium having computer readable code thereon for providing extensible code visualization, the medium comprising:
    instructions, executable by the processor, for generating a model from program code;
    instructions, executable by the processor, for mapping said model to a user interface (UI) to produce a UI comprising nodes that reflect said program code;
    instructions, executable by the processor, for allowing a user to add a selected visualization to a selected code element of the program code by specifying, in a configuration file, the selected visualization for a node in the UI corresponding to the selected code element of the program code, instructions executable by the processor, for parsing the configuration file when the configuration file is changed, to determine the selected visualization and the corresponding selected code element;

instructions, executable by the processor, for traversing the nodes of the UI to identify a node with a matching element that matches the selected code element from the configuration file and instructions, executable by the processor, for updating the UI by displaying the identified node on a screen with the selected visualization.

11. The non-transitory computer readable medium of claim 10 wherein the program code is a test script.

12. The non-transitory computer readable medium of claim 10 wherein said instructions for generating a model comprise instructions for parsing said program code and generating an abstract syntax tree (AST).

13. The non-transitory computer readable medium of claim 12 wherein said instructions for generating a model comprises instructions for generating a model from said AST of said program code.

14. The non-transitory computer readable medium of claim 13 wherein said instructions for generating a model utilizes a series of XML configuration files.

15. The non-transitory computer readable medium of claim 10 further comprising instructions for reflecting changes made to said program code in said UI and instructions for reflecting changes made to said UI in said program code.

16. The non-transitory computer readable medium of claim 15 wherein said instructions for reflecting changes made to said program code in said UI comprises:

instructions for receiving a change to said program code;
instructions for updating said model to reflect the change to said program code; and
instructions for updating said mapping of said model to said UI to produce a UI reflecting said program code.

17. The non-transitory computer readable medium of claim 15 wherein said instructions for reflecting changes made to said UI in said program code comprises:

instructions for receiving a change to said UI;
instructions for updating said model to reflect the change to said UI; and
instructions for updating said program code to reflect the update to said model.

18. The non-transitory computer readable medium of claim 16 wherein said instructions for changes made to said program code include instructions for adding a module to said program code.

19. A computer system comprising:

a memory;
a processor;
a communications interface;
an interconnection mechanism coupling the memory, the processor and the communications interface; and
wherein the memory is encoded with an application providing extensible code visualization, that when performed on the processor, provides a process for processing information, the process causing the computer system to perform the operations of:

receiving program code;
generating a model relating to said program code;
mapping said model to a user interface (UI) to produce a UI comprising nodes that reflect said program code;
providing a code visualizer to allow a user to add a selected visualization to a selected code element of the program code by specifying, in a configuration file, the selected visualization for a node in the UI corresponding to the selected code element of the program code,
parsing the configuration file, when the configuration file is changed, to determine the selected visualization and the corresponding selected code element;
traversing the nodes of the UI to identify a node with a matching element that matches the selected code element from the configuration file; and
updating the UI by displaying the identified node on a screen with the selected visualization.

20. The computer system of claim 19 wherein said program code comprises program code for a test script and, wherein the application is configured to reflect changes made to said program code in said UI and to reflect changes made to said UI in said program code.

* * * * *

UNITED STATES PATENT AND TRADEMARK OFFICE
CERTIFICATE OF CORRECTION

PATENT NO. : 8,336,023 B2  
APPLICATION NO. : 12/256266  
DATED : December 18, 2012  
INVENTOR(S) : Kuzsma, Jr. et al.

Page 1 of 1

It is certified that error appears in the above-identified patent and that said Letters Patent is hereby corrected as shown below:

In column 5, line 8, delete "KeyStokeFunctions" and insert -- KeyStrokeFunctions --, therefor.

In column 6, line 54, after "Next," delete "a".

In column 7, line 33-34, delete "models.storesjavajavaCodeMappings" and insert -- models.stores.java.javaCodeMappings --, therefor.

In column 8, line 3, after "keystroke.gif" insert -- . --.

In column 8, line 20, after "alone" insert -- . --.

In column 11, line 49, delete "and or" and insert -- and/or --, therefor.

In column 12, line 4, after "submitted" delete "that".

In column 12, line 13, in Claim 1, delete "(UI)" and insert -- (UI) --, therefor.

In column 13, line 5, in Claim 10, delete "instructions" and insert -- instructions, --, therefor.

In column 13, line 6, in Claim 10, delete "file" and insert -- file, --, therefor.

In column 13, line 12, in Claim 10, delete "file" and insert -- file; --, therefor.

Signed and Sealed this  
Twelfth Day of March, 2013

Teresa Stanek Rea  
*Acting Director of the United States Patent and Trademark Office*